OR 3,760,275

United States Patent [19]
Ohsawa et al.

[11] 3,760,275
[45] Sept. 18, 1973

[54] AUTOMATIC TELECASTING OR RADIO BROADCASTING MONITORING SYSTEM

[76] Inventors: Takashi Ohsawa, No. 4-5, Akasaka 8-chome, Minato-ku, Tokyo; Michiaki Karita, No. 35-25, Naritahigashi 4-chome, Suginami-ku, Tokyo, both of Japan

[22] Filed: Dec. 28, 1970

[21] Appl. No.: 101,543

[30] Foreign Application Priority Data

Oct. 24, 1970 Japan ............................45/93281

[52] U.S. Cl. ....................... 325/31, 178/5.6, 325/311
[51] Int. Cl. ............................................. H04b 1/16
[58] Field of Search ................. 178/5.6; 179/100.28, 179/2 AS; 325/311, 31

[56] References Cited

UNITED STATES PATENTS

| | | | |
|---|---|---|---|
| 3,341,815 | 9/1967 | Axe | 340/171 R |
| 3,643,025 | 2/1972 | David et al. | 340/171 R |
| 3,290,437 | 12/1966 | Goldmark et al. | 178/5.6 |
| 3,335,219 | 8/1967 | Goldmark et al. | 178/5.6 |

*Primary Examiner*—Robert L. Richardson
*Attorney*—Wenderoth, Lind & Ponack

[57] ABSTRACT

An automatic telecasting or radio broadcasting monitoring system. The system has a tuner and a start signal detector circuit coupled to the tuner for picking up a first arriving signal having a particular wave form from among a group of signals received by the tuner and containing information relating to a particular program. An end signal detector circuit is coupled to the tuner for picking up a last arriving signal having a different particular wave form from the first arriving signal from among the group of signals. A plurality band pass filters is coupled to the tuner for passing signals having predetermined different frequencies from the first and last arriving signals from among the group of signals between the first and last arriving signals. A plurality of temporary monitoring signal storing devices is coupled to the detector circuits and the filters each comprising a buffer storing device for temporarily storing at least the intermediate signals which have passed the filters. Each of the buffer storing devices further comprise means to read out the signals temporarily stored therein in response to the last arriving signal. A scanner circuit coupled to the temporary monitoring signal storing devices supplying the signals from the buffer memory devices in succession to a monitoring signal recording means.

2 Claims, 9 Drawing Figures

Patented Sept. 18, 1973 3,760,275

3 Sheets-Sheet 1

INVENTOR

OHSAWA, TAKASHI
KARITA MICHIAKI

BY

Wenderoth, Lind & Ponack

ATTORNEYS

INVENTOR
OHSAWA. TAKASHI
KARITA. MICHIAKI
BY Wenderoth, Lind & Ponack
ATTORNEYS

OHSAWA TAKASHI INVENTOR
KARITA MICHIAKI
BY
Wenderoth, Lind & Ponack
ATTORNEY

AUTOMATIC TELECASTING OR RADIO BROADCASTING MONITORING SYSTEM

BACKGROUND OF THE INVENTION.

It has been well known in the art that in a telecasting, particular image and aural signals such as commercials are recorded on a telecasting signal recording medium such as a cinema film or a like memorizing medium among image and aural signals of a sustaining program such as a drama program, for example, which are to be recorded on the same recording medium. When a transmitter directly transmits the particular and sustaining program image and aural signals together and the particular image and aural signals are to be clearly distinguished from the sustaining program image and aural signals without use of any other cinema film or the like recording medium or the time point at which the telecasting of such particular signals is started or terminated and/or the time interval during which the particular signals are being telecast are to be monitored and recorded on another recording medium or cinema film, such distinguishing and/or monitored and recording operations have to be solely performed by manual means such as by viewing the image receiving tube directly while listening to voice from the speaker and/or by recording the received signals manually on a signal recording medium.

Similarly, also in radio broadcasting, particular aural signals such as commercials are recorded on a radio broadcasting signal recording medium such as a recording tape or the like among aural signals of a sustaining broadcasting program such as a drama program or the like, for example, which are also to be recorded on the same recording medium. When the transmitter transmits both the aural signals and the particular aural signals are to be clearly distinguished from the sustaining aural signals or the time point at which the broadcasting of such particular aural signals is started or terminated and the time interval during which the particular aural signals are being broadcast are also to be monitored and recorded, such distinguishing and/or monitoring and recording operations have to be performed solely by manual means such as by listening to the speaker directly and/or by manually recording the received aural signals on a recording medium.

SUMMARY OF THE INVENTION

This invention relates to an automatic telecasting or radio broadcasting monitoring system and more particularly, to an automatic telecasting or radio broadcasting monitoring system in which monitoring aural signals are recorded on the aural signal recording track of a signal recording medium among ordinary aural signals of a particular and/or sustaining telecasting or radio broadcasting program recorded on the same recording medium. The monitoring aural signals are transmitted from the transmission station together with the ordinary aural signals, both the aural signals are received by the receiving station in such a manner that the monitoring aural signals are distinguished from the ordinary aural signals. The received monitoring signals are recorded on a monitoring aural signal recording medium whereby the receiving station automatically confirms that a particular and/or sustaining telecasting or radio broadcasting program has been telecast or broadcast. The automatic telecasting or radio broadcasting monitoring system of the present invention is suitably for simultaneously monitoring a plurality of programs which are being simultaneously telecast or broadcast through a plurality of channels.

One object of the present invention is to provide an automatic telecasting or radio broadcasting monitoring system in which the receiving station automatically and separately records a plurality of different pieces of information which are simultaneously being telecast or broadcast through a plurality of channels. The different pieces of information are distinguished from each other and the separate pieces of information are automatically and separately processed without the use of any manual means.

According to the present invention, there is provided an automatic telecasting or radio broadcasting monitoring system comprising a start signal detector circuit for picking up a first arriving signal having a particular wave form from among a group of signals received by a receiver and containing information relating to a particular program; an end signal detector circuit for picking up a last arriving signal having a different particular wave form from among said group of signals; a plurality of band pass filters for passing therethrough signals having predetermined different frequencies in said group of signals interposed between said first and last signals, respectively; a plurality of temporary monitoring signal storing devices each comprising a buffer storing device for temporarily storing all said first signal, intermediate signals having different frequencies which have passed through said plurality of band pass filters, respectively and said last signal, each of said buffer storing devices being further adapted to read out said signals temporarily stored therein in response to said last signal; a monitoring signal recording means for recording said signals stored in said temporary storing devices; a scanner circuit for supplying said signals stored in said buffer memory devices in succession to said monitoring signal recording means; and a tuner, said temporary monitoring signal storing devices being interposed between said scanner circuit and tuner.

The above and other objects and attendant advantages of the present invention will be more clearly apparent to those skilled in the art from a reading of the following detailed description of the same referring to the accompanying drawings.

BRIEF DESCRIPTION OF THE DRAWINGS

The accompanying drawings illustrate one embodiment of the present invention as applied to telecasting wherein:

FIG. 3A is a diagram showing examples of sequential combinations of monitoring signals employed as codes for representing a plurality of cinema films;

FIG. 3B is a chart showing the code numbers assigned to said cinema films of FIG. 3A;

PREFERRED EMBODIMENT OF THE INVENTION

Figures 1, 2, 3:
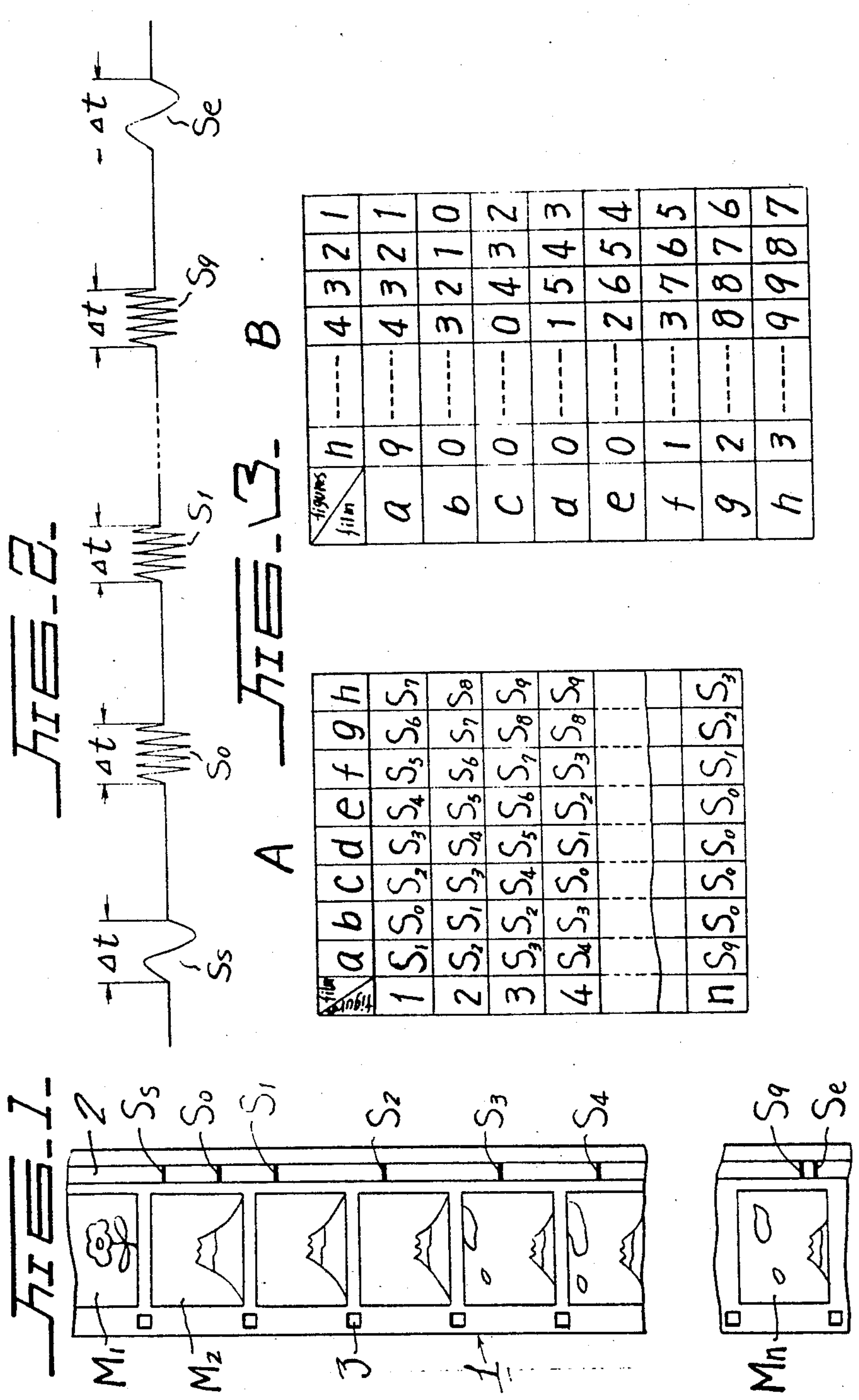
FIG. 1 is a fragmentary plan view of a section of cinema film employed as a telecasting signal recording medium on which monitoring signals as well as ordinary signals are recorded.
FIG. 2 is a graph of wave forms of said monitoring signals recorded on the film of FIG. 1.

The present invention will be now described referring to the accompanying drawings and more particularly, to FIG. 1 thereof.

FIG. 1 shows a section of a conventional film 1 employed as a telecasting signal recording medium and the film has a series of equally spaced image bearing areas $M_1$, $M_2$ . . . $M_n$ where image signals to be telecast have been recorded. The film 1 also has an aural signal recording track 2 along one side of the image bearing areas (the right hand side as seen in FIG. 1) where aural signals respectively relating to the image signals recorded on the image bearing areas $M_1$, $M_2$ . . . $M_n$ have been optically or magnetically recorded. The film 1 also has a series of perforations 3 at equally spaced intervals along the other side of the image bearing areas (the left hand side as seen in FIG. 1) at the junctures between adjacent image bearing areas.

In the illustrated film 1, if it is assumed that the image bearing area $M_1$ and another image bearing area $M_{(n+1)}$ next or subsequent to the image bearing area $M_n$, which areas will hereinafter be referred to as "selected image bearing areas" carry image signals which have nothing to do with or are clearly distinguishable from those recorded on the image bearing areas $M_2$ . . . $M_n$, the portions of the aural signal recording track 2 corresponding to the image bearing area $M_1$ and the image bearing area $M_{(n+1)}$ subsequent to the image bearing area $M_n$ respectively have recorded thereon aural signals relating to the images at the two selected image bearing areas $M_1$ and $M_{(n+1)}$ which aural signals have nothing to do with or are clearly distinguishable from those recorded on the portions of the track 2 corresponding to the image signals in the image bearing areas $M_2$ . . . $M_n$. The image signals in the image bearing areas $M_2$ . . . $M_n$ will be referred to as "ordinary image signals" for the "particular telecast" and those in the two selected image bearing areas will be referred to as ordinary signals for other than the particular telecast. Similarly, the aural signals recorded on the portions of the track 2 corresponding to the image bearing areas $M_2$ . . . $M_n$ will be referred to as "ordinary aural signals" for the "particular telecast," and those recorded on the areas of the track 2 corresponding to the two selected image bearing areas $M_1$ and $M_{(n+1)}$ will be referred to as ordinary aural signals for other than the particular telecast.

Various combinations of the sequence of monitoring aural signals are employed as codes representing films employed as signal recording media having specific signals recorded therein for telecasting.

For example, an order to indicate the time points at which a telecast of a particular film 1 as shown in FIG. 1 was started and ended, as predetermined indicating signals, an audible sine wave signal $S_s$ (start signal) of a relatively low frequency on the order of 40–60 $H_z$, for example, having at least one cycle is recorded at a point adjacent to one of the two portions of the aural signal recording track 2 corresponding to image area $M_1$ and another audible sine wave signal $S_e$ (end signal) of a relatively low frequency on the order of 30 $H_z$, for example, having at least one cycle is recorded at a point adjacent to the portion of the aural signal memorizing track 2 adjacent image area $M_{(n+1)}$ among the ordinary aural signals.

In addition to these start and end signals $S_s$ and $S_e$, the aural signal recording track 2 also has recorded among the ordinary aural signals thereon different monitoring code signals $S_0$ . . . $S_9$ between the points at which the start and end signals are recorded, which monitoring code signals correspond to different frequencies represented by numerals 0 . . . 9, respectively. These monitoring code signals $S_0$ . . . $S_9$ the frequencies of which correspond to the numerals 0 . . . 9, respectively, are arranged in various sequential combinations as shown in FIG. 3 and the various combinations of the monitoring code signals are employed as codes for various films to be telecast. By using all the monitoring code signals $S_s$, $S_0$ . . . $S_9$ and $S_e$, the telecast of a particular film can be monitored by the automatic monitoring device of the invention as will be described hereinafter.

Each of the above-described monitoring code signals $S_s$, $S_0$ . . . $S_9$ and $S_e$ are recorded on the aural signal recording track 2 over a predetermined fixed length of time Δt, as shown in FIG. 2. When these monitoring signals are to be recorded on the aural signal recording track 2, the ordinary aural signals previously recorded at areas on the track 2 where the monitoring signals are desired to be recorded are first optically or magnetically erased and then the monitoring signals are optically or magnetically recorded in the above-mentioned areas from which the ordinary signals have been erased.

Figure 4:
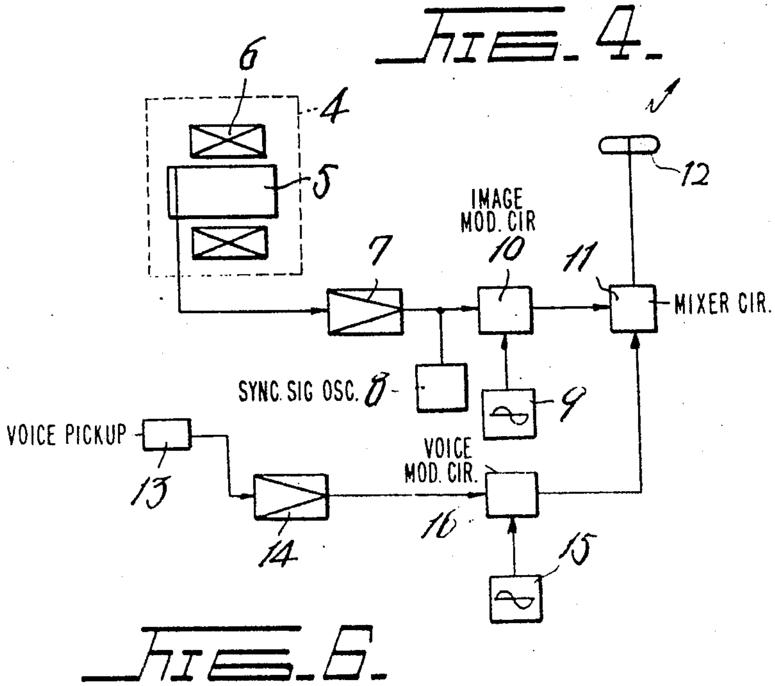
FIG. 4 is a block diagram of a television transmitter employed in one embodiment of the automatic telecasting monitoring system according to the present invention.

Referring now to FIG. 4 of the accompanying drawings, a television transmitter useful in the monitoring system of the invention is diagramatically shown. As in the conventional television transmitters, the illustrated television transmitter comprises a television camera 4 which has a pickup tube 5 adapted to pick up physical image signals and optically convert the picked up images into electron beams and a deflecting yoke 6 adapted to receive the electron beams emitted from the pick up tube and deflect the electron beams vertically and horizontally. The thus deflected electron beams are then passed to an image amplifier circuit 7 as electric image signals.

The electric image signals are amplified in and issue from the image amplifier circuit 8 whereupon the electrical image signals have added thereto horizontal and vertical synchronizing signals from a horizontal and vertical synchronizing signal oscillator 8. The electric image signals pass to an image modulator circuit 10 which is in turn supplied with image carrier wave signals from an image carrier wave oscillator circuit 9 whereby the amplitude of the image carrier wave signals is modulated by the electrical image signals.

The modulated electric image signals are then passed to a mixer circuit 11 where the image signals are mixed with modulated aural signals, a description of which will be given hereinafter, to be transmitted by a transmitter antenna 12.

On the other hand, a voice pick up means 13 detects physical aural signals and converts the signals into electric signals which are then passed to a voice amplifier circuit 14 where the electric aural signals are amplified. The amplified aural signals are then passed to a voice modulator circuit 16 which is in turn supplied with voice carrier wave signals from a voice carrier wave signal oscillator 15 whereby the amplitude of the carrier wave signals is modulated by the electric aural signals. The modulated aural signals are passed to the above-mentioned mixer circuit 11 where the aural signals are mixed with the above-mentioned modulated image signals. The resulting mixed signals are transmitted by the above-mentioned transmitter antenna 12 as electric waves.

The ordinary signals recorded on the above-mentioned film 1 are picked up by the pickup tube 5 and image output signals from the pickup tube are passed to the image amplifier circuit 7 where the image output signals are amplified. The amplified image output signals are then passed to the image modulator circuit 10 together with the synchronizing signals from the horizontal and vertical synchronizing signal oscillator 8 whereby the amplified image output signals have added thereto the synchronizing signals. In the modulator circuit 10, the synchronizing signal containing amplified output signals modulate the amplitude of image carrier wave signals which are supplied to the modulator circuit from the image carrier wave signal oscillator circuit 9.

On the other hand, the ordinary and monitoring aural signals recorded on the aural signal recording track 2 of the film 1 are detected by the voice pickup means 13 and then passed to a voice amplifier circuit 14 where the aural signals are amplified and thereafter, the amplified aural signals are passed to a voice modulator circuit 16 which is in turn supplied with voice carrier wave signals from a voice carrier wave signal oscillator 15 whereby the amplitude of the carrier wave signals is modulated by the aural signals. The modulated image signals from the image modulator circuit 10 and the modulated aural signals from the voice modulator circuit 16 are passed to the mixer circuit 11 where the image and aural signals are mixed together and the resulting mixed signals are transmitted by the transmitter antenna 12.

Figure 5:
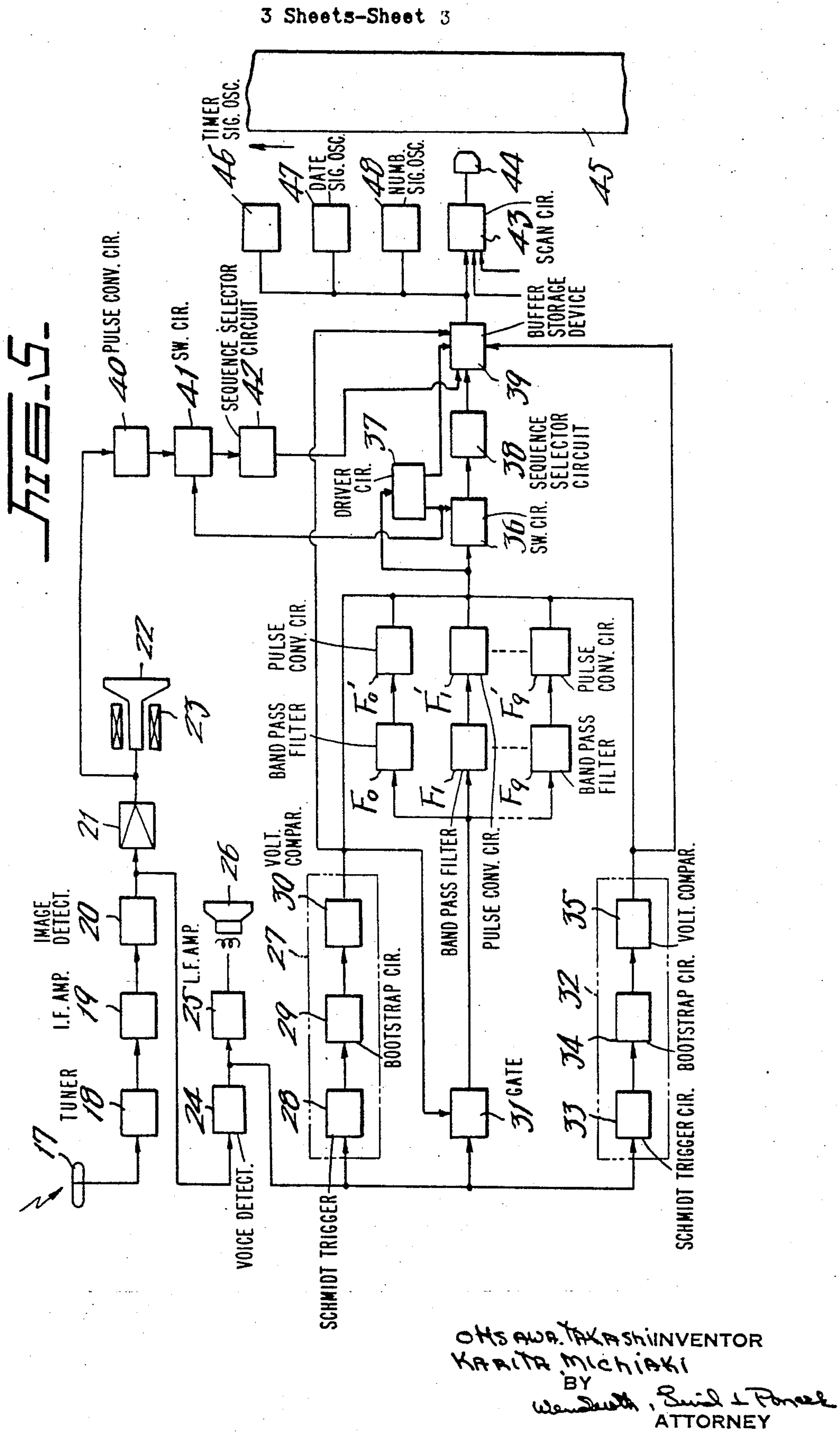
FIG. 5 is a block diagram of said embodiment of an automatic telecasting monitoring system employed in conjunction with a conventional television receiver.

Prior to proceeding to a description of the automatic monitoring system of the present invention, a description will be given of the conventional parts of the television receiver shown in FIG. 5. The electric waves arriving from the above-mentioned transmission station are received by a receiver antenna 17 and certain of these electric waves having particular channel carrier frequencies are selected from among all the received electric waves and amplified by a tuner 18 (including a high frequency amplifier circuit, a local oscillator circuit and a frquency converter circuit). The tuner also serves to convert high frequency signals.

Furthermore, in order to improve the selectivity of output signals which have been amplified through the above-mentioned tuner 18, the output signals are passed to an intermediate frequency amplifier circuit 19 where the signals are amplified to stable signals over a wide band width with a high gain.

Image signals carried by the above-mentioned intermediate frequency signals are picked up by an image detector 20 which returns the image signals to their original forms which the signals had before they were carried by the electric waves and the output signals of the detector 20 are passed to an image signal amplifier circuit 21. The amplified image signals are then passed to an image receiving tube 22 where the electron gun of the tube discharges electron beams and the beams are deflected by a deflecting yoke 23 positioned adjacent to the tube so as to cause the electron beams to impinge against the fluorescent screen of the image receiving tube 22 whereupon the phosphor of the fluorescent screen is illuminated whereby the images can be visually observed.

On the other hand, in order that received aural signals can be heard, output signals from the above-mentioned image detector 20 are passed to a voice detector 24 which returns the received aural signals to their original form which the signals had before they were carried by the electric waves and the signals are then passed to a low frequency amplifier circuit 25 where the signals are amplified. The output signals of the amplifier circuit 25 are passed to a speaker 26 which reproduces the output signals as acoustic waves.

Figure 7:
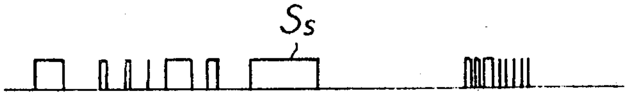
FIG. 7 is a graph of wave forms of output signals from the Schmidt trigger circuit shown in the block diagram of FIG. 5.
Figure 8:
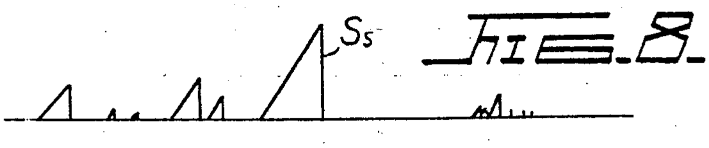
FIG. 8 is a graph of wave forms of output signals from the boot-strap circuit shown in the block diagram of FIG. 5.
Figure 9:
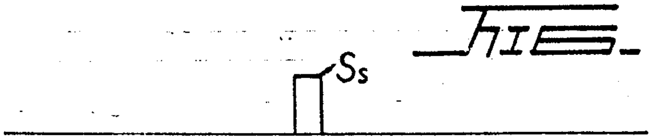
FIG. 9 is a graph of wave forms of output signals of the voltage comparator circuit shown in the block diagram of FIG. 5.

The automatic telecasting or broadcasting monitoring system has a plurality of temporary monitoring signal storage devices among its essential components and the memory devices detect the start signal $S_s$ from the aural signal recording track 2 of the cinema film 1 and convert the signal to a pulse. For this purpose, the output signals of the above-mentioned voice detector 24 are passed to a start signal detector circuit 27 which comprises a Schmidt trigger circuit 28, a bootstrap circuit 29 and a voltage comparator circuit 30, all connected in series. The output signals from the voice detector 24 are passed to the Schmidt trigger circuit 28, where the signals are converted to pulses as shown in FIG. 7, and the pulse signals are then passed to the bootstrap circuit 29 where the widths of the pulses are converted to voltages the values of which vary depending upon the variation in the pulse widths, as shown in FIG. 8. The voltage comparator circuit 30 detects only pulse signals having wider pulse widths or higher voltages from among the pulse signals from the bootstrap circuit 29 and accordingly, only the higher voltage pulse signals issue from the voltage comparator circuit 30 as output, as shown in FIG. 9. Thus, the output signals from the voltage comparator circuit 30 comprise only the pulses of the start signal $S_s$. The start signal pulses open a gate circuit 31 and the opened gate circuit passes the output signals from the voice detector 24 to succeeding band pass filters $F_0$–$F_9$ for frequencies $S_0$ . . . $S_9$, respectively.

The output signals from the band pass filters $F_0$ . . . $F_9$ are converted to pulses in the same manner as start signal detector circuit pulse converter circuits $F'_0$ . . . $F'_9$, resectively whereby monitoring code signals $S_0$ . . . $S_9$ are detected, respectively.

In order to detect the end signal $S_e$ and convert the signal to pulses, the output signals from the above-mentioned voice detector 24 are passed to an end signal detector circuit 32 which comprises similar circuit components to those described in connection with the start signal detector circuit 27, and accordingly, the end signal detector circuit comprises a Schmidt trigger circuit 33, a bootstrap circuit 34 and a voltage comprator circuit 35 which cooperate with each other to shape the wave forms of the signals and convert only the end signal $S_e$ to pulses. Thereafter, the pulse-converted and detected start signals $S_s$ by detected the start signal detector circuit 27, the pulse-converted and detected monitoring code signals $S_0 \ldots S_e$ which have passed through the band pass filters $F_0 \ldots F_9$ and pulse converter circuit $F'_0 \ldots F'_9$ and the pulse-converted and detected end signal $S_e$ detected by the end signal detector circuit 32 are passed to a switching circuit 36 and a driver circuit 37.

When an input is applied to the driver circuit 37, the switching circuit actuates a switch corresponding to the value of the input. For example, when the driver circuit 37 is supplied with an input from the start signal detector circuit 27 to operate the driver circuit, the operation of the driver circuit 37 permits only the start signal $S_s$ to pass through the switching circuit 36 to a sequence selector circuit 38 which is adapted to select the sequence of arriving signals and pass the selected signal sequence to a corresponding sequence memory section of succeeding buffer storing device 39.

The buffer storing device 39 is adapted to effect a recording on a corresponding row of the device to a particular operation of the driver circuit 37. For example, when it is assumed that the fifth signal in the signal group comprising monitoring code signals $S_0 \ldots S_9$(excluding the start and end signals) is the signal $S_5$, the buffer memory device effects a recording on the section which represents the fifth column and fifth row.

The buffer memory device 39 is caused to effect a recording operation in response to the pulse-converted start signal $S_s$ from the start signal detector circuit 27 and also to effect a readout operation in response to the pulse-converted end signal $S_e$ from the end signal detector circuit 32.

In order to confirm whether image signals recorded in a film are actually being telecast or not while monitoring recordings are being effected the monitoring signals $S_s, S_0 \ldots S_9$ and $S_e$, the image output signals from the image signal amplifier circuit 21 are converted to pulses and detected by a pulse converter circuit 40 and the thus pulse-converted and detected signals are passed, in response to a signal from the driver circuit 37, to a switching circuit 41 the function of which is similar to that of the above-mentioned switching circuit 36.

Having passed through the switching circuit 41, the image output signals pass to a sequence selector circuit 42 which selects a particular arriving sequence of the image output signals and the selected sequence of image output signals is stored in the corresponding section of the buffer storing device 39 with one signal of the monitoring signals $S_s$, $S_0 \ldots S_9$ and $S_e$ corresponding to the selected sequence of arriving image output signals. A temporary monitoring signal storing device is provided for each of the channels of the tuner 18, only one being shown in the drawing. The signals temporarily stored in the buffer storing means 39 are passed through a scanner circuit 43 to a monitoring signal recording means 44 whereupon the recording means is operated for effecting a recording on a monitoring signal recording medium 45. The scanner circuit 43 is adapted to pass in succession the telecasting information recorded in the buffer storing device of each temporary monitoring signal memory device to the monitoring signal recording means 44. The scanner circuit 43 is further supplied with signals from a timer signal oscillator 46 adapted to generate incremental time signals at a predetermined time interval, one incremental signal per 5 minutes, for example, to indicate the starting time point of a particular telecasting program, a date signal oscillator 47 adapted to generate incremental date signals at a predetermined date, one incremental signal per day, for example, to indicate a particular date on which the particular telecasting program is being telecast, and a number monitoring signal oscillator 48 adapted to record the numerically represented type of automatic telecasting monitoring device employed in the system of the present invention to be recorded on a monitoring signal recording medium and to generate a signal corresponding to the numerically represented type of the monitoring device. The signals from these signal oscillators are passed to the monitoring signal recording means 44 through the scanner circuit 43 before the signals from the buffer memory devices 39 are passed to the monitoring signal recording means 44. The signals from the above-mentioned three signal oscillators are precisely record on the monitoring signal recording medium 45 by the monitoring signal recording means 44 so that the signals can be easily read. The monitoring signal memorizing medium 45 is adapted to move each time the monitoring signal recording means receives one signal.

Figure 6:
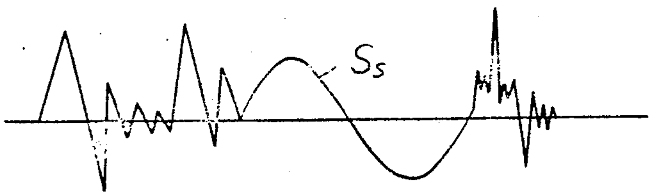
FIG. 6 is a graph of wave forms of aural signals sent from the voice detector shown in the block diagram of FIG.5.

When aural signal waves having the forms as shown in FIG. 6 are received by the antenna 17 and applied through the voice detector 24 to the input side of the Schmidt trigger circuit 28, the signal waves are converted to pulse signals as shown in FIG. 7 by the Schmidt trigger circuit 28. Among the pulse signals, the ordinary aural signals are those having narrower pulse widths because they have higher harmonic waves while the start signal $S_s$ is a pulse having a greater pulse width because the signal is a sine wave having a low frequency. These pulse signals are converted into voltages having higher and lower values with the voltages having varying voltage values depending upon variation in the pulse widths as shown in FIG.8.

From among the signals having varying voltage values, only signals having higher voltage values are detected by the voltage comparator circuit 30 and the pulses as shown in FIG. 9 issue from the voltage comparator circuit 30.

Therefore, the pulses from the voltage comparator circuit 30 comprise only pulses due to the start signal $S_s$. The pulse-converted start signal $S_s$ operates the buffer storing device 39 to cause the device to effect a recording operation and at the same time operates the driver circuit 37 to cause the driver circuit to drive the switching circuit 36 which in turn passes the start signal $S_s$ therefrom through the sequence selector circuit 38 to the buffer storing device 39 which in turn stores a recording in a section thereof corresponding to the start signal $S_s$.

Since the driver circuit 37 has been operated and in consequence, the switching circuit 41 has been driven by the operated driver circuit upon the arrival of the start signal $S_s$ at the start signal detector circuit 27, the image signals fed from the image signal amplifier circuit 21 to the pulse converter circuit 40 and now converted to pulses by the converter circuit are passed through the switching circuit 41 and sequence selector circuit 42 in the order to the buffer storing device 39 where the pulse-converted image signals are stored in the storage section of the buffer memory device in which the start signal $S_s$ is to be stored. Thus, it will be understood that when such pulse-converted image signals are not stored in the particular section of the buffer storing device, even if the start signal $S_s$ arrives at the particular buffer storing section the buffer storing section will not store the monitoring signals and will not transmit signals to the scanner circuit 43 to indicate that the program has been telecast.

The pulse-converted start signal $S_s$ also opens the gate circuit 31 whereupon the circuit passes the output signals from the voice detector 24 to the band pass filters $F_0 \ldots F_9$.

Now assuming that following the start signals $S_s$, the monitoring code signal $S_0$ passes through the band pass filter $F_0$, the code signal is converted to pulses by the pulse converter circuit $F'_0$. Thereafter, in the same way as mentioned hereinabove in connection with the storage of the start signal $S_s$, the monitoring code signal $S_0$ is stored in a position in the corresponding row in one column of the monitoring code signal storage section of the buffer storing device 39. At the same, an image signal related to the second monitoring code signal after the start signal $S_s$ is also stored in a second position corresponding to the second monitoring code signal of the buffer storing device 39.

It will be understood that the second or any one of the monitoring code signals $S_0 \ldots S_9$ which arrives first will not be memorized in the buffer storing device when no image signal is being telecast.

Similarly, the monitoring code signals following the second monitoring code signal are stored in respective corresponding positions in the buffer storing device 39.

When the end signal $S_e$ from the voice detector 24 is converted to pulses by the end signal pulse converter circuit 32 and passed to the buffer storing device 39, the buffer storing device initiates its readout operation to pass the signals stored in the buffer memory device to the scanner circuit 43. Then the scanner circuit 43 first passes the timer signal from the timer signal oscillator 46 and then passes the stored signals from the monitoring signal recording medium 45. Thereafter, the date signal from the date signal oscillator 47 and the monitoring number signal from the monitoring number signal oscillator 48 are recorded at respectively predetermined positions on the monitoring signal recording medium 45 by the monitoring signal recording means 44. Lastly, the monitoring signals stored in the buffer storing device 39 are recorded in respectively predetermined positions on the monitoring signal recording medium 45.

In the foregoing, description has been given of the arrangement for one channel. However, according to the present invention, it is also contemplated that a plurality of temporary monitoring signal storing devices having the above arrangement may be provided between the tuner 18 and scanner circuit 43 and in such a case, monitoring signals stored in each buffer memory device 39 are in succession passed to the monitoring signal recording means 44 in accordance with the order of the buffer storing devices and a plurality of programs being simultaneously telecast through a plurality of channels are simultaneously recorded on the monitoring signal recording medium.

By comparing the monitoring signals recorded on the recording medium in this way with programs actually telecast by suitable information processing means, it can be confirmed whether the programs telecast on the plurality of channels are being properly telecast and received or not. According to the present invention, with the multiple channel arrangement, the time bands for respective programs can be distinguished from each other.

The simultaneous monitoring of telecast programs on multiple channels is one important advantage of the automatic monitoring telecasting or broadcasting system of the present invention.

With the multiple channel arrangement of the monitoring system of the invention, it is not necessary to provide a separate monitoring device for each channel, but a signal device can monitor the programs being telecast through all the channels. Thus, the monitoring operation can be performed economically and simply.

When the start and end signals $S_s$ and $S_e$ are not recorded on the monitoring signal recording medium 45, but are simply employed as operating signals for operating the gate circuit 31 and buffer storing devices 39, the objects contemplated by the present invention can be attained without difficulty. And even if the buffer storing devices 39 are so arranged that the devices will not effect any memorizing operation in response to the start signal $S_s$, but will effect the monitoring operation mechanically and effect a reading operation with end signal $S_e$, the object contemplated by the invention can be attained.

In the foregoing, although a description has been given of the monitoring of a particular telecast program, wire or wireless broadcasting can also be monitored by the monitoring system of the invention with similar effects by eliminating the image signal monitoring components from the system.

As is clear from the foregoing, according to the present invention, with addition of a small number of means to the conventional receiver, television and radio programs broadcast through a plurality of channels can be automatically and simultaneously monitored and the monitoring operation can be effected economically and simply.

While there has been described what is at present considered to be the preferred embodiment of this invention, it will be obvious to those skilled in the art that various changes and mofifications may be made therein without departing from the invention, and it is desired, therefore, in the appended claim to cover all such changes and modifications as fall within in the true spirit and scope of the invention.

What we claim is:

1. An automatic telecasting monitoring system comprising: a television receiver tuner, a start signal detector circuit coupled to said tuner for picking up a first arriving monitoring signal having a particular wave form from among a group of signals received by said tuner which group of signals contains information relating to a particular program; an end signal detector circuit coupled to said tuner for picking up a last arriving monitoring signal having a different particular wave form from said first arriving monitoring signal from among said group of signals; a plurality of band pass filters coupled to said tuner for passing monitoring signals having predetermined different frequencies from said first and last arriving signals from among said group of signals between said first and last arriving signals; a plurality of temporary monitoring signal storing devices coupled to said detector circuits and said filter each comprising a buffer storing device for temporarily storing at least said intermediate monitoring signals which have passed said filters, each of said buffer storing devices further comprising means to read out said signals temporarily stored therein in response to said last arriving monitoring signal; a pulse converter means coupled between said tuner and said buffer storing device for converting image signals to pulses and actuating said buffer storing device to store monitoring signals only when image signals are actually being received by said tuner, a monitoring signal recording means for recording said signals in said temporary storing devices; and a scanner circuit coupled between said temporary monitoring signal storing devices and said recording means for supplying said signals from said buffer memory devices in succession to said monitoring signal recording means.

2. A system as claimed in claim 1 in which said buffer memory devices each comprise means for temporarily storing said first arriving signal, the signals having different frequencies which have passed through said plurality of band pass filters, and said last arriving signal.

* * * * *